United States Patent
Karame et al.

(10) Patent No.: US 11,470,053 B2
(45) Date of Patent: Oct. 11, 2022

(54) PRIVACY-PRESERVING MACHINE LEARNING

(71) Applicant: NEC Laboratories Europe GmbH, Heidelberg (DE)

(72) Inventors: Ghassan Karame, Heidelberg (DE); Giorgia Azzurra Marson, Heidelberg (DE); Helen Moellering, Neuenkirchen (DE)

(73) Assignee: NEC CORPORATION, Tokyo (JP)

(*) Notice: Subject to any disclaimer, the term of this patent is extended or adjusted under 35 U.S.C. 154(b) by 485 days.

(21) Appl. No.: 16/600,612

(22) Filed: Oct. 14, 2019

(65) Prior Publication Data
US 2021/0112038 A1  Apr. 15, 2021

(51) Int. Cl.
*H04L 9/40* (2022.01)
*G06N 3/04* (2006.01)
*G06N 3/08* (2006.01)

(52) U.S. Cl.
CPC .......... *H04L 63/0428* (2013.01); *G06N 3/04* (2013.01); *G06N 3/08* (2013.01)

(58) Field of Classification Search
CPC combination set(s) only.
See application file for complete search history.

(56) References Cited

U.S. PATENT DOCUMENTS

2019/0050564 A1* 2/2019 Pogorelik ............ G06N 3/0472
2019/0392305 A1* 12/2019 Gu ..................... G06F 21/53
2020/0036512 A1* 1/2020 Vaikuntanathan ...... H04L 63/08
2020/0082270 A1* 3/2020 Gu ........................ G06N 3/0427
2020/0242466 A1* 7/2020 Mohassel ................ H04L 9/008
2020/0320206 A1* 10/2020 Cammarota ............ G06F 21/57
2021/0319098 A1* 10/2021 Pogorelik ................ G06N 3/04

OTHER PUBLICATIONS

Hunt, Tyler et al. "Chiron: Privacy-preserving Machine Learning as a Service," Mar. 15, 2018, arXiv: 1803:05961v1.
Hanzlik, Lucjan et al. "MLCapsule: Guarded Offline Deployment of Machine Learning as a Service," Feb. 6, 2019, arXiv: 1808:00590v2.
(Continued)

*Primary Examiner* — Harris C Wang
(74) *Attorney, Agent, or Firm* — Leydig, Voit & Mayer, Ltd.

(57) ABSTRACT

A computer-implemented method of instantiating a machine learning model with a host processing system is provided. The host processing system includes a trusted execution environment (TEE) and an untrusted processing system (UPS). The method includes: preparing, with the host processing system, a compiler encoding an architecture of the machine learning model; receiving, from a client processing system, source data; and producing, with the compiler, software based on the received source data and model parameters stored on the host processing system. The software includes an untrusted software component for performance on the UPS and a trusted software component for performance on the TEE. The untrusted software component and the trusted software component are configured to, when performed in concert, instantiate the machine learning model.

12 Claims, 7 Drawing Sheets

(56) References Cited

OTHER PUBLICATIONS

Tramer, Florian et al. "Slalom: Fast, Verifiable and Private Execution of Neural Networks in Trusted Hardware," Feb. 27, 2019, arXiv: 1806.03287v2.

Tramer, Florian et al. "Slalom: Fast, Verifiable and Private Execution of Neural Networks in Trusted Hardware," arXiv: 1806.03287v1, Cornell University Library, 201 Olin Library Cornell University Ithaca, NY 14853, Jun. 8, 2018, XP081021624.

* cited by examiner

PRIVACY-PRESERVING MACHINE LEARNING

FIELD

Among other things, the present application discloses conducting machine learning in a manner that preserves privacy. A client can outsource the machine learning to a host. A trusted execution environment of the host can perform a component of the machine learning (e.g., instantiate at a portion of a deep neural network).

BACKGROUND

Through machine learning, a processing system can be trained to perform tasks (e.g., image classification, audio classification, etc.) that would be impractical to explicitly code. Machine learning can include both the training of a machine learning model and the application of the trained machine learning model to classify source data. Both aspects of machine learning can be computationally expensive. In machine learning as a service (MLaaS), a service provider (also called a "host") offers computing infrastructure for data providers (also called "clients") to outsource machine learning operations on source data.

Some processing systems include trusted execution environments (TEEs) such as Intel SGX®. TEEs can verify the integrity of software (e.g., code embodying a machine learning model) through remote attestation. Remote attestation can be realized through a digital signature scheme. For example, a trusted component on the host computes a digest of the binary, e.g., using a hash function, and signs the digest. The signature is then sent to a remote verifier that checks: (1) that the digest of the binary matches a reference value (e.g., a reciprocally computed hash); and (2) the validity of the received signature by using the verification key corresponding to the signing key of the trusted component.

Hunt et al. (*Chiron: Privacy-preserving Machine Learning as a Service*; CoRR abs/1803.05961 (2018)), Hanzlik et al. (*MLCapsule: Guarded Offline Deployment of Machine Learning as a Service*; CoRR abs/1808.00590 (2018)), and Tramèr et al. (*Slalom: Fast, Verifiable and Private Execution of Neural Networks in Trusted Hardware*; CoRR abs/1806.03287 (2018)) propose mechanisms for integrating TEEs with machine learning. Hunt et al., Hanzlik et al., and Tramèr et al. are hereby incorporated by reference.

SUMMARY

In an embodiment, the present invention provides a computer-implemented method of instantiating a machine learning model with a host processing system. The host processing system includes a trusted execution environment (TEE) and an untrusted processing system (UPS). The method includes: preparing, with the host processing system, a compiler encoding an architecture of the machine learning model; receiving, from a client processing system, source data; and producing, with the compiler, software based on the received source data and model parameters stored on the host processing system. The software includes an untrusted software component for performance on the UPS and a trusted software component for performance on the TEE. The untrusted software component and the trusted software component are configured to, when performed in concert, instantiate the machine learning model.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Machine learning can occur in the context of a service where a host (also called a "service provider" or a "host processing system") offers a machine learning platform (also called a "model") to a client (also called a "data provider" or a "client processing system"). Among other things, the present application discloses conducting machine learning in a manner that preserves secrecy of one or more of: (i) the original inputs (also called "source data") to the machine learning model, (ii) the classifications that the machine learning model yields, (iii) hidden outputs that the machine learning model produces, and/or (iv) the structure (e.g., code) of the machine learning platform. Exemplary data flow through a machine learning platform is labeled in greater detail below with reference to FIG. 7.

In an embodiment, the host can conceal the machine learning platform's architecture and/or parameters from a client. The client can conceal, from untrusted hardware on the host: (i) the original inputs (also called "source data") on which the machine learning platform operates, and (ii) the unblinded data of each layer of the machine learning model, including the ultimate results (also called classifications) that the exit layer of the machine learning platform produces.

Therefore, the present application discloses embodiments of a method for performing machine learning in a privacy-preserving manner. The method can be configured to enable a client to outsource machine learning modeling to a server in a way that the client's source data remains confidential, therefore offering data privacy. The method can be configured to enable model secrecy, meaning that the client does not learn the details of the model deployed by the server. For example, server can reveal the architecture, but not the parameters, of the model to the client.

In an embodiment, the method integrates a trusted-execution environment ("TEE") to ensure modeling, performed entirely at the host, offers data privacy to the client. In an embodiment, the trusted hardware enables secure communication with the client, and requires that the host perform computation securely, without leaking sensitive information to the server's untrusted platform.

The host can include an intermediate processing system (also called an "untrusted processing system") in addition to the trusted execution environment ("TEE" also called a "trusted processing system"). The intermediate processing system can be untrusted from the client's perspective. The intermediate processing system can include one or more graphics processing units (GPUs). The TEE can be implemented as hardware distinct from the intermediate processing system.

The client can transmit source data (e.g., images to be classified) to the host via the intermediate processing system, in a format that TEE, but not the intermediate processing system, can decrypt. The intermediate processing system can route the encrypted source data to the TEE. In an embodiment, the client transmits the source data over a secure channel to the TEE, the secure channel having been setup via remote attestation.

The TEE can decrypt the source data and coordinate operation of the machine learning model (e.g., deep neural network) on the host. The TEE can delegate linear computation of the modeling to the intermediate processing system, which can possess more processing power (e.g., via the GPUs) than the TEE, which can lack any GPUs. The TEE can delegate operations of the machine learning model in such a manner that preserves secrecy of (i) the source data and (ii) the unblinded outputs of the machine learning platform, including any ultimate classifications. The TEE can encrypt the classification in a manner only decipherable by the client (e.g., with a public key that the client supplies).

Figure 7:
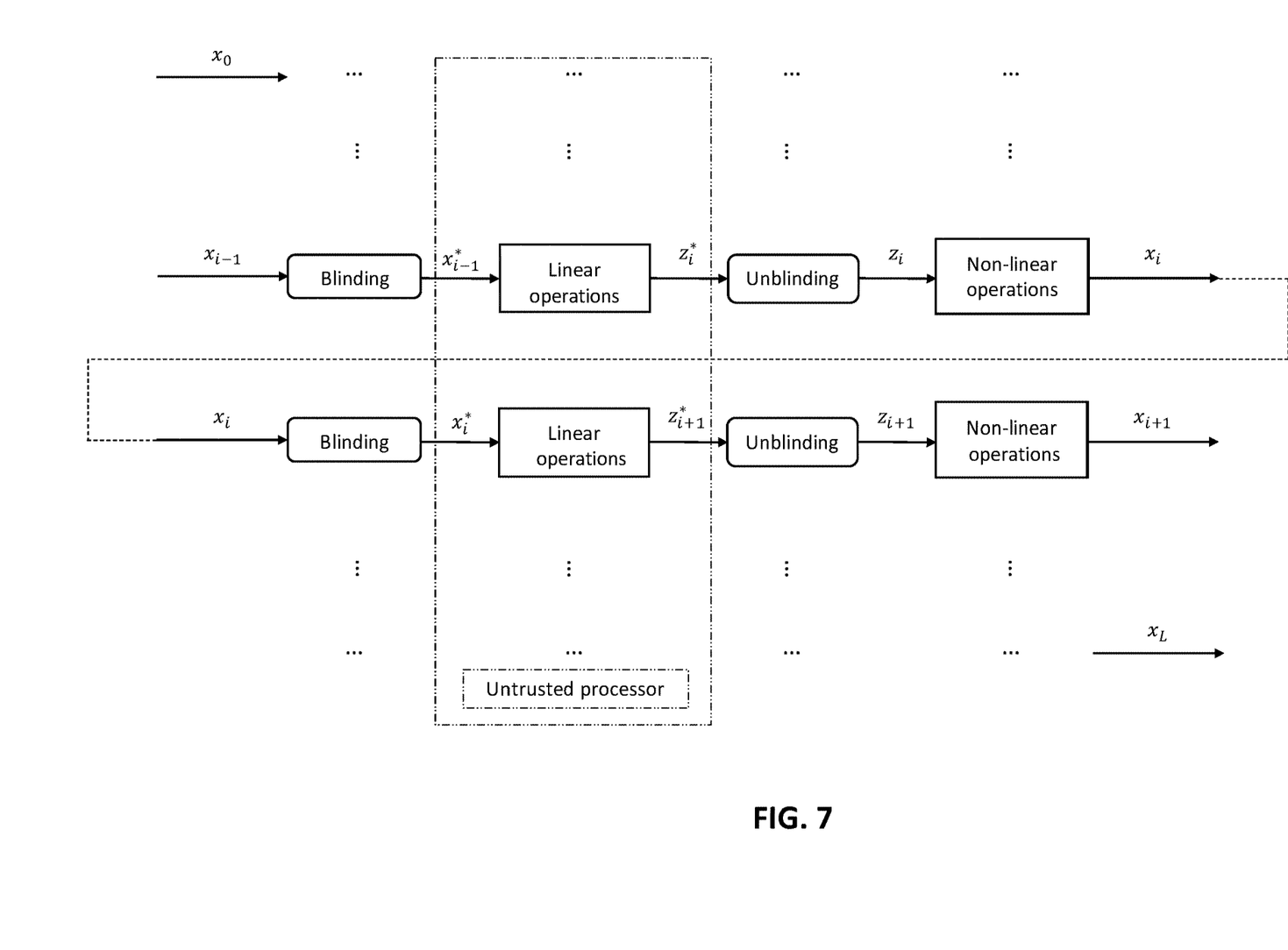
FIG. 7 is a block diagram of data flow through an exemplary machine learning model of an exemplary machine learning as a service platform.

FIG. 7 illustrates exemplary data flow of the machine learning model which can be, for example, a neural network instantiated across the intermediate (e.g., untrusted) processing system and the trusted execution environment. Each row represents a respective layer i of the neural network, where i=0 is the entry layer, i=[1 to L-1] are the hidden layers, and i=L is the exit layer.

Each layer i=0 to L processes the following pieces of data: an input $x_{i-1}$ (also called an "unblinded input"), a blinded input $x^*_{i-1}$ (also called a "first blinded intermediate"), a blinded intermediate output $z^*_i$ (also called a "second blinded intermediate"), an unblinded intermediate output $z_i$ (also called an "unblinded intermediate"), and an output $x_i$ (also called an "unblinded output"). Unblinded output $x_i$ doubles as the unblinded input to subsequent layer i+1. Unblinded input $x_0$ is the source data. Unblinded layer output $x_L$ is the final result (also called "classification") returned by the neural network.

Each piece of data can be a matrix (e.g., a unidimensional matrix such as a vector). As used herein, the term "classification" can mean the unblinded output of an exit layer of a machine learning model without requiring that such unblinded output represent a data label or data prediction.

Other naming conventions can be applied for the pieces of data depicted in FIG. 7. For example, for layer i: $x_{i-1}$ can be called the input, the intermediate pieces of data $x^*_{i-1}$, $z^*_i$, and $z_i$ can be called "values", and $x_i$ can be called the "output". As another example, each piece of data can be numerically labeled such that an unblinded input $x_{i-1}$ is a first piece of data, a blinded input $x^*_{i-1}$ is a second piece of data, etc.

The processes labeled "blinding", "linear operations", "unblinding" and "non-linear operations" are further discussed below. In an embodiment, only the pieces of data within the broken box labeled "untrusted processor" are known to the intermediate processing system. All other pieces of data are only known, from the perspective of the host, to the trusted execution environment.

Thus, in an embodiment, intermediate processing system performs the linear operations and, for each layer "i" has access to blinded input $x^*_{i-1}$ and blinded intermediate $z^*_i$, but not the other depicted pieces of data. The trusted execution environment performs the blinding, the unblinding, and the non-linear operations and thus has access to each depicted piece of data.

In an embodiment, the present invention provides a computer-implemented method of instantiating a machine learning model with a host processing system. The host processing system includes a trusted execution environment (TEE) and an untrusted processing system (UPS). The method includes: preparing, with the host processing system, a compiler encoding an architecture of the machine learning model; receiving, from a client processing system, source data; and producing, with the compiler, software based on the received source data and model parameters stored on the host processing system. The software includes an untrusted software component for performance on the UPS and a trusted software component for performance on the TEE. The untrusted software component and the trusted software component are configured to, when performed in concert, instantiate the machine learning model.

The method can further include provisioning, with the TEE, a secure enclave; and compiling the software within the secure enclave to conceal the trusted software component from the UPS.

The method can further include attesting, with the TEE and to the client processing system, integrity of the compiler based on receiving a request, from the client processing system, to process the source data with the machine learning model.

In an embodiment, the trusted software component is configured to outsource linear operations to the untrusted software component in a blinded manner to conceal, from the UPS, inputs to at least one layer of the machine learning model.

The method can further include determining, with the TEE, an input to a layer of the machine learning model; blinding, with the TEE, the input to produce a first blinded intermediate; applying, with the UPS, a weight to the first blinded intermediate to produce a second blinded intermediate; stripping, with the TEE, the blinding from the second blinded intermediate to produce an unblinded intermediate; and applying, with the TEE, an activation function to the unblinded intermediate to produce an unblinded output of the layer.

In an embodiment, the unblinded output of the layer is an activation of a node of the layer and the unblinded second intermediate quantifies a weighted local receptive field of the node.

In an embodiment, the layer is an earlier layer and the method further includes: determining, with the TEE, an unblinded input to a subsequent layer of the machine learning model based on the unblinded output of the earlier layer; blinding, with the TEE, the subsequent unblinded input to produce a subsequent blinded first intermediate; applying, with the UPS, a subsequent weight to the subsequent first blinded intermediate to produce a blinded second intermediate; stripping, with the TEE, the blinding from the subsequent second blinded intermediate to produce a subsequent unblinded intermediate; and applying, with the TEE, an activation function to the subsequent unblinded intermediate to produce an unblinded output of the subsequent layer.

The method can further include transmitting a classification of the machine learning model to a client processing system through a secure communication session between the TEE and the client processing system, wherein the classification of the machine learning model is based on the unblinded output of the layer.

In an embodiment, the machine learning model includes a deep neural network and the layer is an exit layer of the deep neural network. In an embodiment, the UPS includes a graphics processing unit (GPU).

In an embodiment, the present invention provides a host processing system for instantiating a machine learning model. The host processing system includes a trusted execution environment (TEE) and an untrusted processing system (UPS). The host processing system is configured to: prepare a compiler encoding an architecture of the machine learning model; receiving, from a client processing system, source data; and produce, with the compiler, software based on the received source data and model parameters stored on the host processing system. The software includes an untrusted software component for performance on the UPS and a trusted software component for performance on the TEE. The untrusted software component and the trusted software component are configured to, when performed in concert, instantiate the machine learning model.

The host processing system can be configured to: provision, with the TEE, a secure enclave; and compile the software within the secure enclave to conceal the trusted software component from the UPS.

The host processing system can be configured to: attest, with the TEE and to the client processing system, integrity of the compiler based on receiving a request, from the client processing system, to process the source data with the machine learning model.

In an embodiment, the trusted software component is configured to outsource linear operations to the untrusted software component in a blinded manner to conceal, from the UPS, inputs to at least one hidden layer of the machine learning model.

In an embodiment, the present invention provides a non-transitory computer readable medium for instantiating a machine learning model with a host processing system including a trusted execution environment (TEE) and an untrusted processing system (UPS). The medium includes program code for configuring the host processing system to: prepare a compiler encoding an architecture of the machine learning model; receive, from a client processing system, source data; and produce, with the compiler, software based on the received source data and model parameters stored on the host processing system. The software includes an untrusted software component for performance on the UPS and a trusted software component for performance on the TEE. The untrusted software component and the trusted software component are configured to, when performed in concert, instantiate the machine learning model.

Figure 1:
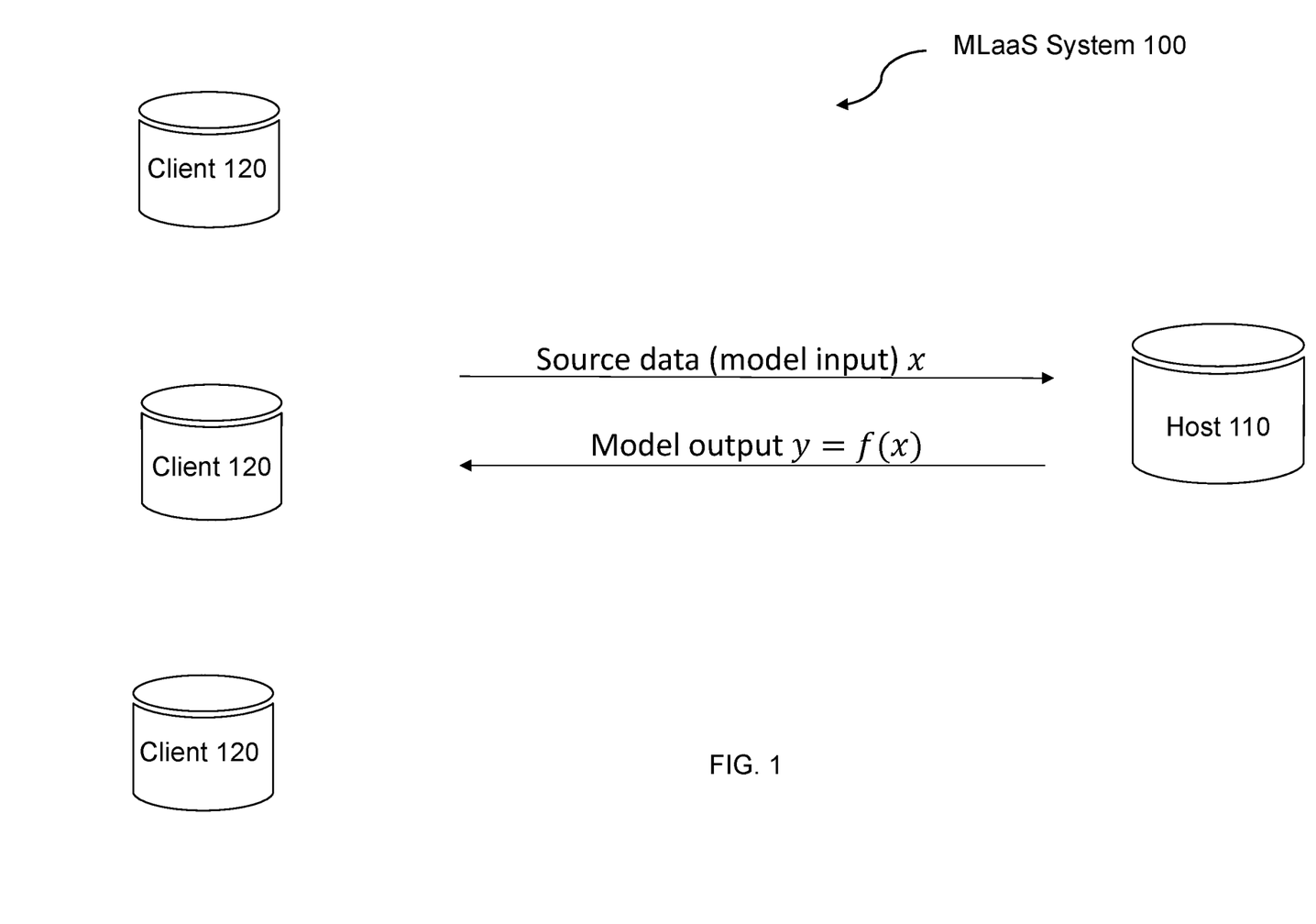
FIG. 1 is a schematic of an exemplary machine learning as a service platform.
Figure 2:
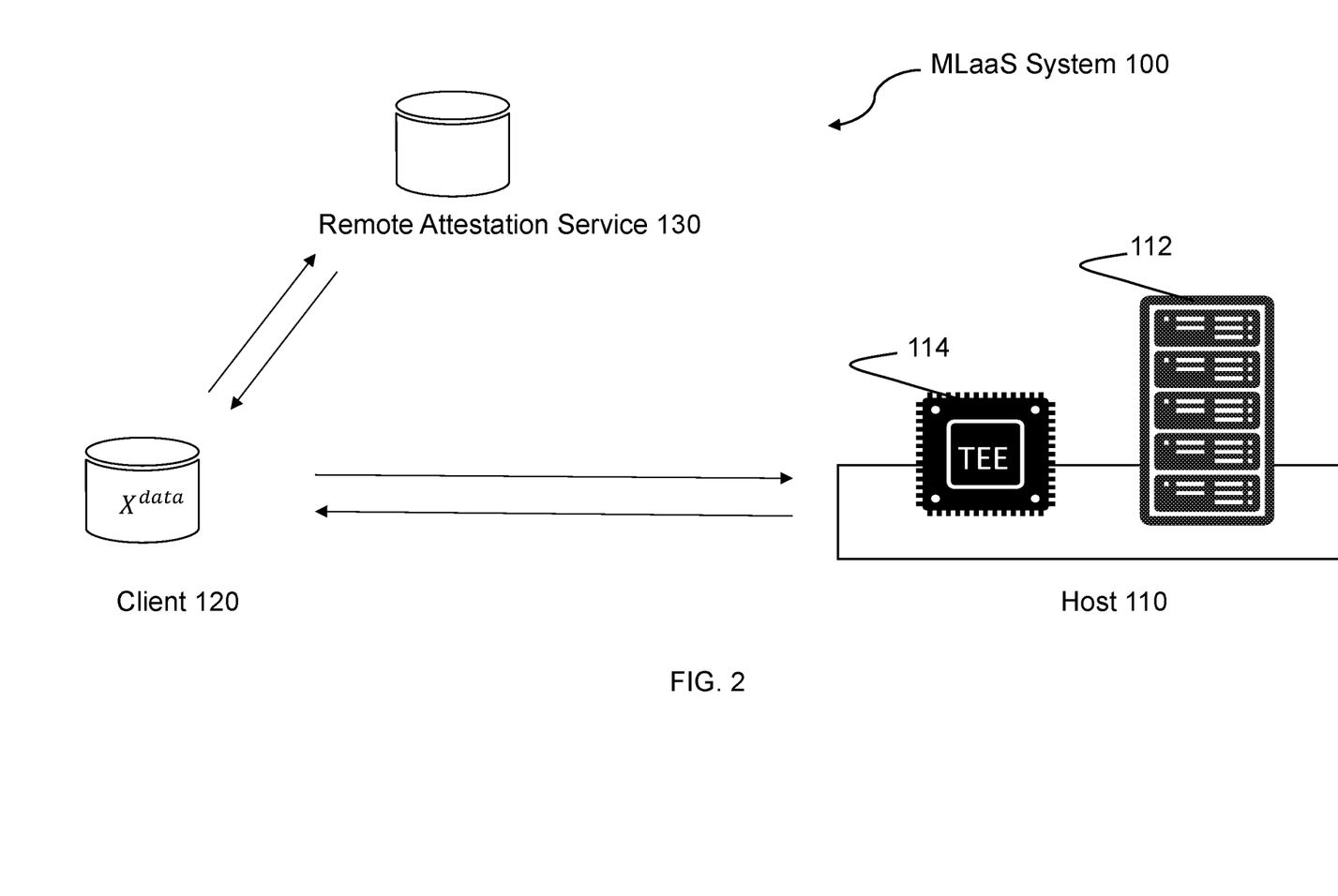
FIG. 2 is a schematic of the exemplary machine learning as a service platform of FIG. 1 including exemplary additional features.

FIGS. 1 and 2 depict a Machine Learning as a Service (MLaaS) system 100 (also called a "system") where a host 110 (also called a "service provider" or a "host processing system") includes a computing infrastructure for clients 120 (also called "data providers" or "client processing systems") to perform machine learning operations. In this exemplary scenario, clients 120 can possess source data (e.g., measurements such as internet traffic metrics, images, sound recordings, etc.) but lack high-performance computing capabilities (e.g., computing power) necessary to run and/or train a machine learning model. Therefore, clients 120 rely on host 110 to perform processor-intensive machine-learning model training and/or applying a trained machine-learning model to obtain predictions (e.g., classifications).

Figure 4:
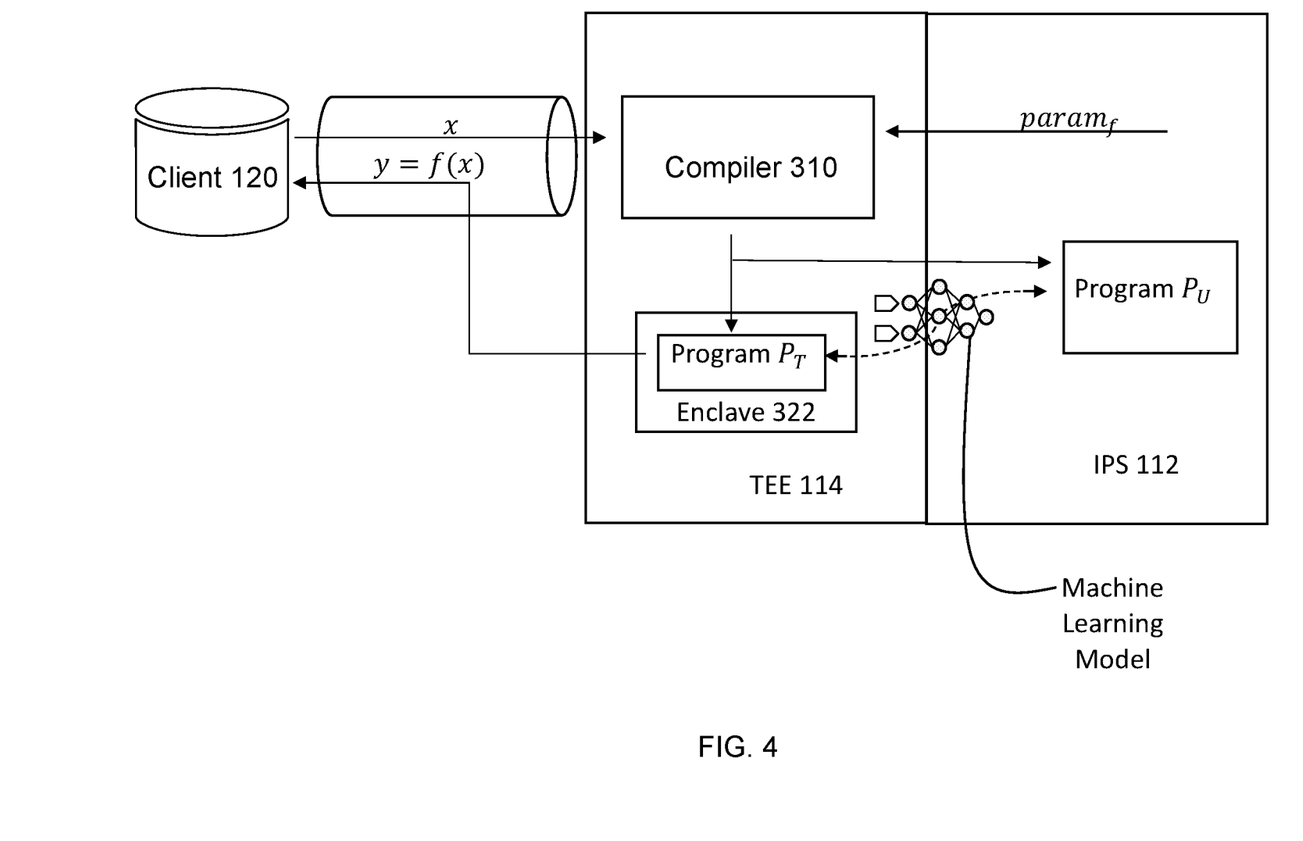
FIG. 4 schematically depicts an exemplary operation of a machine learning as a service platform.

As shown in FIG. 1, system 100 can be configured to enable clients 120 to outsource machine learning tasks to a host 110. The host 110 can possess a trained machine-learning model (also called a "deep-learning model" or a "machine-learning platform") f: X→Y for classifying source data $x \in X^{data}$. As shown in FIG. 2, host 110 can include intermediate processing system 112 and TEE 114. An example of TEE 114 (also called a "secure enclave") is Intel SGX. As shown in FIG. 4, the machine learning model can be instantiated as two independent programs: $P_U$ and $P_T$ confined to intermediate processing system 112 and TEE 114 respectively. A compiler 310 can create the programs based on (i) source data that client 110 supplies and/or (ii) parameters $param_f$ that intermediate processing system 112 supplies.

Clients 120 can possess source data $x \in X^{data} \subset X$ ready for classification meaning that (i) $X^{data}$ includes one or more elements x and (ii) $X^{data}$ is a subset of X. Put differently, $X^{data}$ contains one or more elements $x_1, \ldots, x_n$, where n is the size of X. If, for example, X represents the set of all images capable of being classified by given machine learning model, then $X^{data}$ can represent the subset of those images possessed by clients 120 and element x can represent a particular image. As used herein, "source data" can refer to either or both of x and $X^{data}$ as client 120 can submit a single element $x \in X^{data}$ for classification or can supply the entire set of $X^{data} = x_1, \ldots, x_n$ for classification.

Host 110 can offer an API to the clients 120. The API can enable clients 120 to submit source data $x \in X^{data}$ (e.g., images, audio, internet traffic metrics) to host 110. Host 110 runs the machine learning model f: X→Y on source data $x \in X^{data}$, obtaining the classification y=f(x) for $x \in X^{data}$ predicted by the model. Host 110 returns classification y to client 120. As further discussed below, one or both of the source data and the classification can be encrypted in a format that client 120 and TEE 114, but not intermediate processing system 112, can decipher.

MLaaS systems in which no portion of host 110 can decrypt the client-supplied source data suffer from a substantial efficiency penalty due to computationally intense cryptographic operations necessary to apply a machine learning model to encrypted data. In an embodiment, because at least a portion of host 110 (e.g., TEE 114) accesses the unencrypted original source data, the machine learning platform of host 110 consumes substantially less computational resources and electricity than if the source data remained encrypted through its entire stay on host 110.

Embodiments of the present invention improve over existing MLaaS techniques, including those discussed in Hunt et al., Hanzlik et al., and Tramer et al. by enabling MLaaS with a remote, Internet-accessible, computationally efficient, and privacy preserving host. In an embodiment, the present invention improves over existing MLaaS techniques by offering a host configured to take advantage of both a trusted hardware component (e.g., TEE 114) for attestation (e.g., attestation, via TEE 114 of the machine learning model that host 110 applies) and computational acceleration through GPU (e.g., intermediate processing system 112).

The present invention enables a method where host 110, equipped with TEE 114, serves as a computing platform for outsourced machine learning (e.g., classification via a machine learning model, such as a deep neural network) while preserving privacy. By interacting with host 110, client 120 can obtain classifications of source data. Embodiments of the method protect both the privacy of (i) the source data of client 120, in the sense that intermediate processing system 112 of host 110 does not learn the source data submitted by the client 120 for classification; and (ii) the secrecy of the host's machine learning model (also called "classifier"), in the sense that client 120 does not learn the parameters (e.g., weight matrix) of the machine learning model.

As shown in FIG. 2 and discussed above, host 110 of MLaaS system 100 can be equipped with an intermediate processing system 112 including a high-performance computing infrastructure and a TEE 114, such as Intel SGX. TEE 114 can enable trusted computing within hardware-protected enclaves. TEE 114 can be configured to provide isolation, ensuring that any data and code stored in the protected memory of the TEE 114 cannot be read or modified by the untrusted intermediate processing system 112. TEE 114 can offer a remote attestation functionality, enabling clients to verify that the TEE 114 can only run trusted code (e.g., code that can be inspected by the clients and/or RAS 130 (discussed below) in a publicly verifiable manner). In an embodiment, a first host includes the intermediate processing system while a second host, distinct from the first host, includes the TEE (also called a "trusted processing system").

Figure 5:
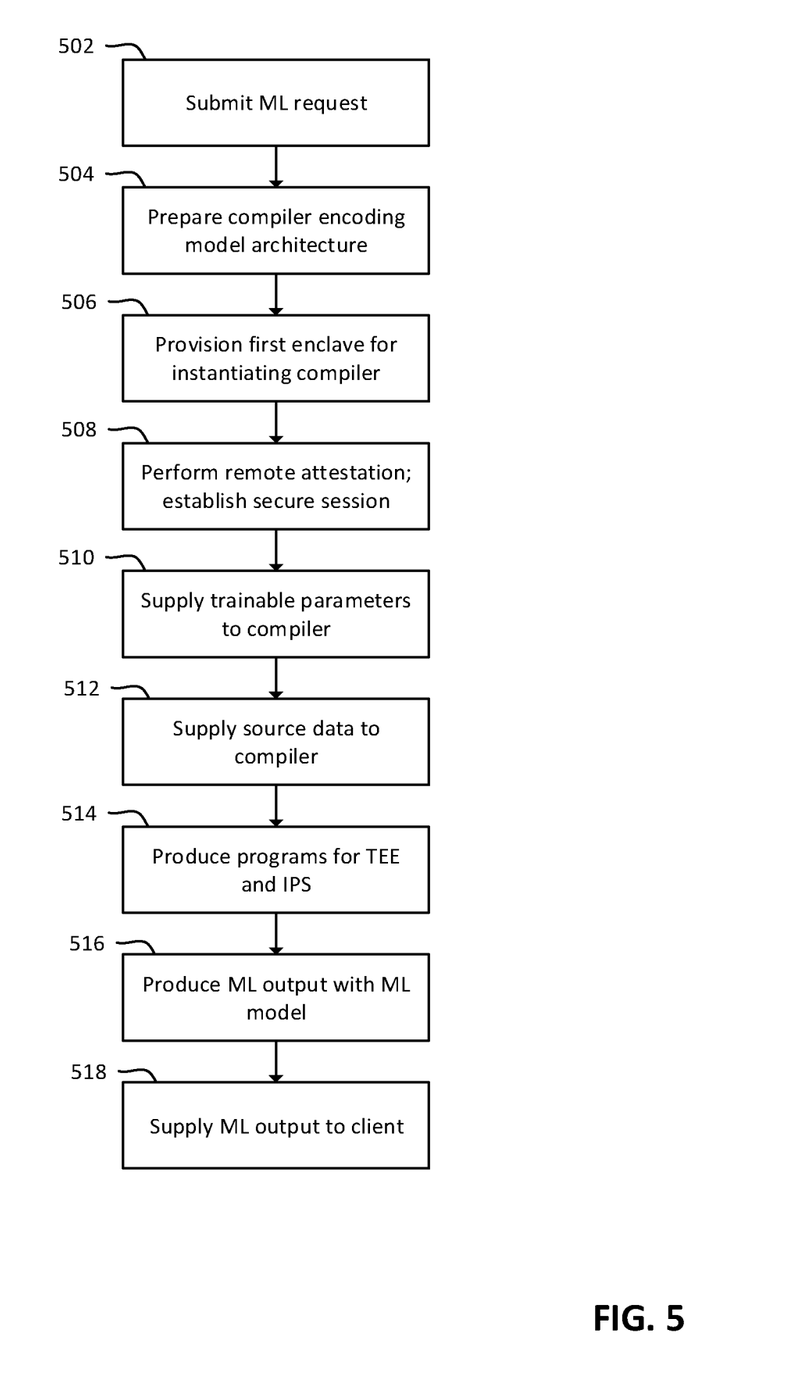
FIG. 5 is a block diagram of an exemplary method of operating a machine learning as a service platform.

As discussed above with reference to FIG. 1, host 100 can possess a trained model f, f: X→Y, for the classification task of interest, where X is the set of instances (to be classified) and Y is the set of possible predictions (also called "labels" or "classifications"). The model can be instantiated through software code (e.g., separate programs as shown in FIG. 5) running on intermediate processing system 112 and/or TEE 114.

As discussed above, client 120 can possess non-labeled source data $X^{data} \subset X$. For convenience, the present disclosure discusses operation of system 100 in the context of a single client 120. However, host 110 can receive requests from any number of clients 120 and each client 120 can represent a single or multiple distinct client processing systems.

Referring to FIG. 2, both host 110 and client 120 can trust remote attestation service ("RAS") 130 (also called an "attestation processing system"). Both host 110 and client 120 can possess an authentic copy of an RAS verification key. Through the RAS verification key, both host 110 and client 120 can verify the authenticity of digital signatures that RAS 130 purportedly authored.

Disclosed is a method of enabling client 120 to outsource the classification of source data $x \in X^{data}$ to host 110, and obtain, from host 110 corresponding machine learning classifications y=f(x) for a machine learning model f (also called a "deep learning model" or a "deep neural network") that host 110 possesses. The method offers (i) data privacy whereby intermediate processing system 112 does not learn $X^{data}$ or classifications y=f(x) for $x \in X^{data}$ and (ii) "model privacy", whereby client 120 does not learn model f (e.g., client 120 does not learn the parameters $param_f$ of model f).

Although TEE 114 of host 110 may temporarily access an unencrypted version of $x \in X^{data}$, TEE 114 can be configured to sequester all unencrypted versions of $x \in X^{data}$ from intermediate processing system 112 of host and further to delete $x \in X^{data}$ before transmitting the machine learning classifications to client 120. Client 120 can verify that TEE 114 is so configured through the remote attestation functionality of TEE 114.

Model f can include a neural network such as a deep neural network ("DNN"). An example of model f was discussed above with reference to FIG. 7. Examples of DNNs include convolutional neural networks, recurrent neural networks, etc. A DNN can include both convolutional and recurrent components. In an embodiment, a DNN can include layers "i" neurons n, and activation function σ; the model parameters $param_f$ includes matrices $\{W_i\}_{i=1,\ldots,L}$ of size m×n, where m is the input size, which represent the network weights.

In an embodiment, the DNN includes (i) an entry layer including entry nodes, (ii) a plurality of hidden layers each including a plurality of hidden nodes, and (iii) an exit layer including exit nodes. Each of the entry, hidden, and/or exit nodes can be neurons. Each neuron can have an activation function including a bias and a weighted local receptive field. The weighted local receptive field for each neuron can be stored as a matrix. A single matrix can store the weighted local receptive field for each neuron in the DNN. A single matrix can store the weighted local receptive field for each neuron of a respective layer of the DNN such as where $\{W_i\}_{i=1,\ldots,L}$ and the quantity of layers including neurons is L. Model parameters $param_f$ can include each of these one or more matrices along with any matrices containing the activation function biases. Model parameters $param_f$ can include any trainable parameter of the model.

After establishing the deep learning architecture (e.g., type of neural network, number of layers, etc.), and in response to a modeling request (i.e., a deep learning request) from client 120, host 110 can initialize the computing infrastructure (e.g., one or more GPUs of intermediate processing system 112) and prepare (e.g., select or dynamically assemble) a compiler 310 based on detected capabilities of the initialized computing infrastructure. Compiler 310 can be configured to produce a neural network architecture based on detected capabilities of the initialized computing infrastructure. For example, compiler 310 can be prepared such that the aggregate quantity of linear operations performed by the neural network is based on the detected capabilities of the initialized computing infrastructure.

Compiler 310 can include the necessary instructions to instantiate a model f to perform the deep learning on classification instances x (e.g., apply the deep learning model to classify source data x classification). Model f and classification instances x can be provided at a later time by host 110 and the client 120 respectively. Host 110 can encode public parameters, including model architecture, within the compiler. Therefore, in an embodiment, host 110 can reveal model architecture to client 120 while concealing the model parameters $param_f$.

Compiler 310 can accept, as inputs, the deep learning model parameters $param_f$ defining f (e.g., weights of the neural network, activation function, etc.) and a classification instance x (i.e., the source data). In response, compiler 310 can generate program code to implement the computation of $F(param_f, x)=f(x)$. For example, compiler 310 can generate program code to instantiate the deep learning model and apply the model to source data to classify the source data. For some model architectures, compiler 310 can specify the steps to be executed within TEE 114 and by the untrusted processor (e.g., intermediate processing system 112), for determining the classification (i.e., output) y=f(x), therefore instantiating the function F.

Compiler 310 can be configured such that no instruction can leak information identifying classification instance x to the untrusted platform of host 110 (e.g., intermediate processing system 112). This can be enforced by regulating the communication between TEE 114 and intermediate processing system 112, ensuring that only operations relevant for classification are permitted, and that such operations treat x in a confidential manner. For example, compiler 310 can be configured such that intermediate processing system 112 cannot recreate the original source data based on any data that the intermediate processing system 112 receives to conduct modeling. Compiler 310 can be loaded as an enclave 320 (see FIG. 3) provisioned by and on TEE 114. At this point, the compiler 310 can be ready for remote attestation. Enclave 320 can represent hardware of TEE 114 and/or software running on TEE 114. In an embodiment, each enclave is a virtual machine software environment executing on TEE 114.

Figure 3:
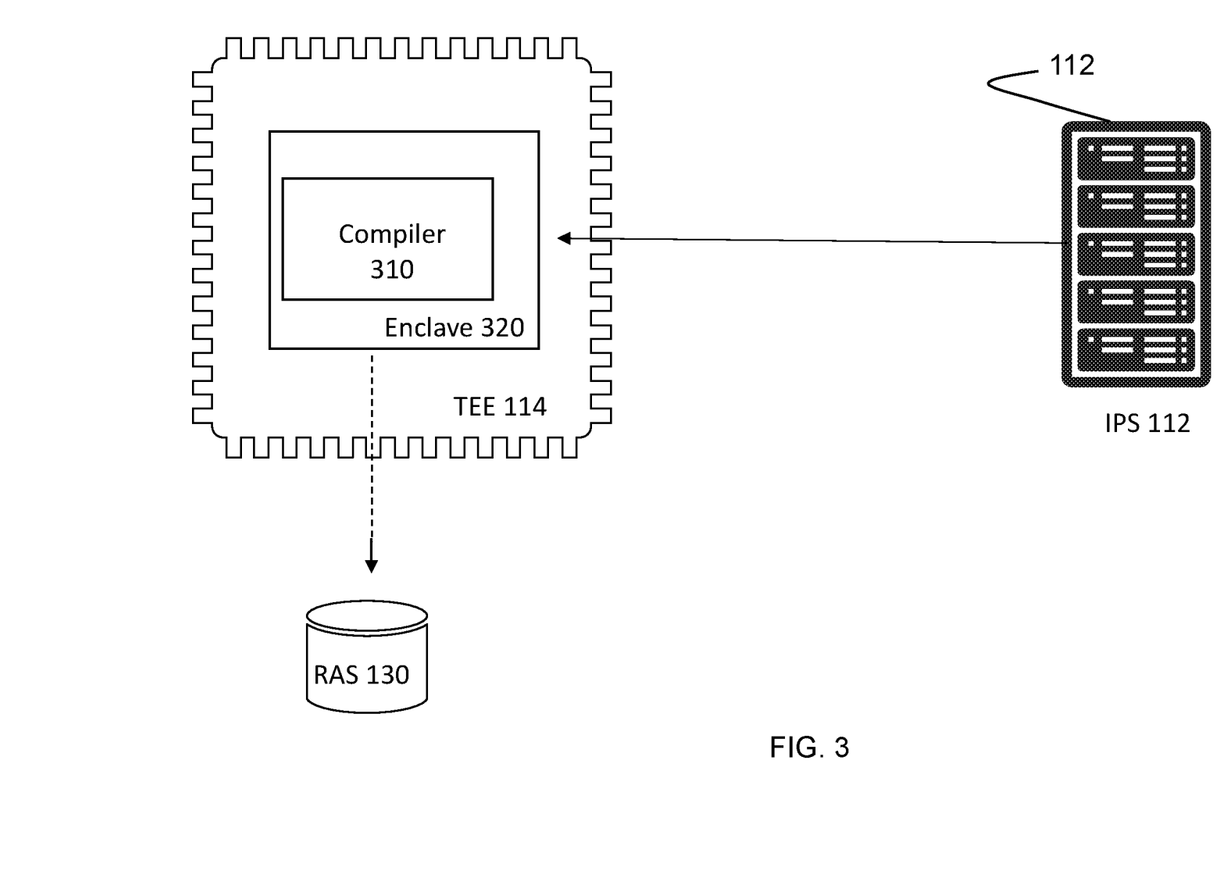
FIG. 3 is a schematic of an exemplary compiling and remote attestation protocol.

Referring to FIG. 3, any client 120 engaging with host 110 for machine learning can issue a reregistration request to host 110. Upon receiving a request, host 110 can engage in a remote attestation protocol with the client 120 and the remote attestation service 130, so that client 120 can verify that (i) host 110 performs the modeling (e.g., classification) on trusted hardware and (ii) the corresponding trusted application (e.g., compiler 310 instantiated through enclave 320) realizes any advertised classification functionality without leaking any source-identifying data from TEE 114 to intermediate processing system 112. In an embodiment, source-identifying data is data sufficient for intermediate processing system 112 to recreate source data.

In an embodiment, the remote attestation protocol enables client 120 and the enclave 320 to establish a secure channel (e.g., a symmetric cryptographic channel with the symmetrically encrypted communications through intermediate processing system 112), so that client 110 can submit x to the enclave and receive the corresponding classification results y=f(x) in a confidential manner, without leaking x and y to the intermediate processing system 114 (i.e., the untrusted component of host 110).

Referring to FIG. 4, client 120 can issue classification requests through the secure communication channel established with the enclave 320. Upon receiving a classification query x (i.e., source data), the enclave 320 runs the compiler 310 on the input model parameters param$_f$ specified by S and the source data x submitted by C, obtaining the instructions necessary to determine the prediction y=F(param$_f$, x) in the form of code (e.g., executable code, interpretable code).

Compiler 310 can produce two programs, $P_T$ and $P_U$, to be performed in concert by the trusted processor (e.g., TEE 114) and the untrusted platform (e.g., intermediate processing system 112), respectively. TEE 114 can trigger the execution of $P_T$ and $P_U$ by provisioning a second enclave 322 for executing (e.g., interpreting) program $P_T$, and by providing the untrusted platform (e.g., intermediate processing system 112) with program $P_U$. Upon completion of the (joint) computation of $P_T$ and $P_U$, the second enclave obtains the classification result y=f(x) and sends it to the client through the secure channel. Both $P_T$ and $P_U$ can be intertwined such that each program requires intermediate values from the other program.

In an embodiment, and referring to FIG. 7, the trusted component $P_T$ and the untrusted component $P_U$ operate as follows: To conceal the source data $x_0$:=x of the client, the trusted component applies an additive stream cipher on the private interim result. The trusted component forwards the resulting first blinded intermediate $x_0^* = x_0 + r_0$, where $r_0$ is the blinding factor (also called a "disguise"), to the untrusted component (corresponding to the "untrusted processor" in FIG. 7). The untrusted component performs the matrix multiplication $x^*_0{}^T \cdot W_1$, obtaining the second blinded intermediate $z_1^*$ of the first layer, which is returned to the trusted component.

Due to the linearity of the outsourced operations, the trusted component (e.g., enclave of TEE 114) can remove the blinding from $z_1^*$ based on the parameters of $W_1$ and the blinding factor $r_0$, obtaining the unblinded intermediate $z_1$. In an embodiment, due to the linearity the operations, and the blinding factor being realized using an additive stream cipher, the trusted component can remove the blinding factor from $z_1^*$ by adding the inverse of $r_0^T \cdot W_1$ to $z_1^*$." For example, the trusted component can obtain $z_1$ from $z_1^*$ by subtracting the term $r_0^T \cdot W_1$:

$$z_1^* - r_0^T \cdot W_1 = x_0^* \cdot W_1 - r_0^T \cdot W_1 = x_0^T \cdot W_1 + r_0^T \cdot W_1 - r_0^T \cdot W_1 = x_0^T \cdot W_1 = z_1$$

The trusted component can apply the activation function σ to compute $x_1 = \sigma(z_1)$, where $x_1$ is both the unblinded output of the first layer of the model and the unblinded input to the second layer of the model. In an embodiment, the activation function σ is a sigmoid activation function, a ReLU activation function, etc. In an embodiment, the activation function σ is a softmax activation function for at least the exit layer.

Referring to FIG. 7, this process can repeat for every layer i=1, . . . , L as follows: unblinded input $x_i$ is known only to the trusted component; the blinding factor $r_i$ is known only to the trusted component (and can be randomly based on predetermined parameters for each layer); first blinded intermediate $x_i^* = x_i + r_i$ is computed on the trusted component and supplied to the untrusted component; second blinded intermediate $z_{i+1}^* = x^*_i{}^T \cdot W_{i+1}$ is computed on the untrusted component (e.g., via the one or more GPUs) and supplied to the trusted component; the blinding is removed by the trusted component, and based on the parameters of $W_{i+1}$ and the blinding factor $r_i$ to yield unblinded intermediate $z_{i+1}$, which is only known to the trusted component; the trusted component applies the activation function $\sigma_{i+1}$ (which can include a bias) to obtain the unblinded output of layer i+1: $x_{i+1} = \sigma_{i+1}(z_{i+1})$.

As shown in FIG. 7, the activation function can be a non-linear operation. Each of the pieces of information shown in FIG. 7 can be a matrix (e.g., a unidimensional matrix such as a vector) to account for a plurality of nodes existing in a layer. The unblinded output $x_L$ of the exit layer (i.e., the classification) can be obtained with a softmax activation function. Therefore, and as shown in FIG. 7, the calculations to instantiate each neuron of each layer of a neural network can occur across multiple processing systems (e.g., intermediate processing system 112 and TEE 114), where the non-linear activations of each neuron are calculated on TEE 114.

To accelerate the modeling process, host 110 (e.g., TEE 114) can instruct the compiler to delegate portions of the computation necessary to apply the machine learning model to the untrusted platform (e.g., intermediate processing system 112). In an embodiment, TEE 114 instructs intermediate processing system 112 to perform all, or at least a majority of (e.g., at least 60, 70, 80, 90, 95, or 99%) of the linear operations present in the machine learning model. The linear operations can include (e.g., consist of) all matrix multiplications $x_i^T \cdot W_i$ where $x_i^T$ is the unblinded output of layer i−1 and $W_i$ is the weight matrix of layer i.

FIG. 5 is a block diagram of an embodiment of a method for performing privacy-preserved machine learning as a service (e.g., for operating system 100).

At block 502, client 120 can submit a machine learning request to host 110. At block 504, and in response to the request, host 110 can prepare a compiler 310 encoding model architecture. At block 506, host 110 can cause TEE 114 to provision a first enclave 320 for instantiating the compiler 310 (e.g., initialize the compiler 310 for remote attestation). The compiler 310 can be selected based on the machine learning model identified in the machine learning request of block 502.

At block 508, client 120 can engage in a remote attestation process with RAS 130 to verify that compiler 310 is configured to conceal source-identifying information from intermediate processing system 112. Further, client 120 can establish a secure communication session with TEE 114 (e.g., with the first enclave 320). The secure communication session can be a symmetric cryptographic session that is routed through and indecipherable to intermediate processing system 112 of host 110. In an embodiment, client 120 and/or RAS 130 obtain the code embodying compiler 310 during the remote attestation process, thereby enabling client 120 and/or RAS 130 to determine the architecture (but not the trainable parameters) of the machine learning model that compiler 310 is configured to generate.

At block 510, host 110 can supply the trainable parameters $param_f$ to the compiler 310 (e.g., to the first enclave 320). The trainable parameters can be stored on, and supplied by, intermediate processing system 112. At block 512, client 120 can supply, based on the verification from RAS 130, source data to host 110 through the secure communication session. At block 514, the compiler can produce two programs, $P_T$ and $P_U$, to be performed in concert by the trusted processor (e.g., TEE 114 within enclave 322) and the untrusted platform (e.g., intermediate processing system 112), respectively.

At block 516, host 110 can apply the machine learning model by running $P_T$ on TEE 114 (e.g., within second enclave 322 provisioned by TEE 114) and by running $P_U$ on intermediate processing system 112. At block 518, TEE 114 can return the classification result to the client via the secure session.

As discussed above, the embodiment of the method illustrated in FIG. 5 can be for privacy-preserved machine learning (e.g., classification). As discussed above, and through the method of FIG. 5, host 110 can prepare a compiler that encodes model architecture. TEE 114 can provision an enclave for instantiating the compiler. Client 120 can engage in a remote attestation protocol with RAS 130 to attest the compiler. Client 120 can establish a secure communication session with the enclave. Host 110 (e.g., intermediate processing system 112) can provide model parameters to the enclave. The compiler can produce the trusted and untrusted components of the machine learning model.

For every classification request (i.e., request to apply the machine learning model), client 120 can send source data to the enclave through the secure session. The enclave can use the received source data as the unblinded input $x_0$ to the first layer of the model. Referring to FIG. 7, for all layers i, the enclave (e.g., the trusted component) can: (a) blind the unblinded input $x_{i-1}$, then send the resulting first blinded intermediate $x^*_{i-1}$ the untrusted component for computation on a GPU; (b) the untrusted component can multiply the first blinded intermediate $x^*_{i-1}$ with the weight matrix of the current layer on the GPU, then send resulting second blinded intermediate $z^*_i$ to the trusted component; (c) the trusted component (e.g., the enclave) can remove the blinding from the received blinded output based on the weight matrix of the current layer to reveal the unblinded intermediate $z_i$; (d) the enclave can apply the activation function to the unblinded intermediate $z_i$ to obtain the unblinded output $x_i$. The unblinded output $x_i$ can serve as the unblinded input $x_i$ to the subsequent layer i+1. The enclave can transmit the ultimate classification to client 120 through the secure session.

Figure 6:
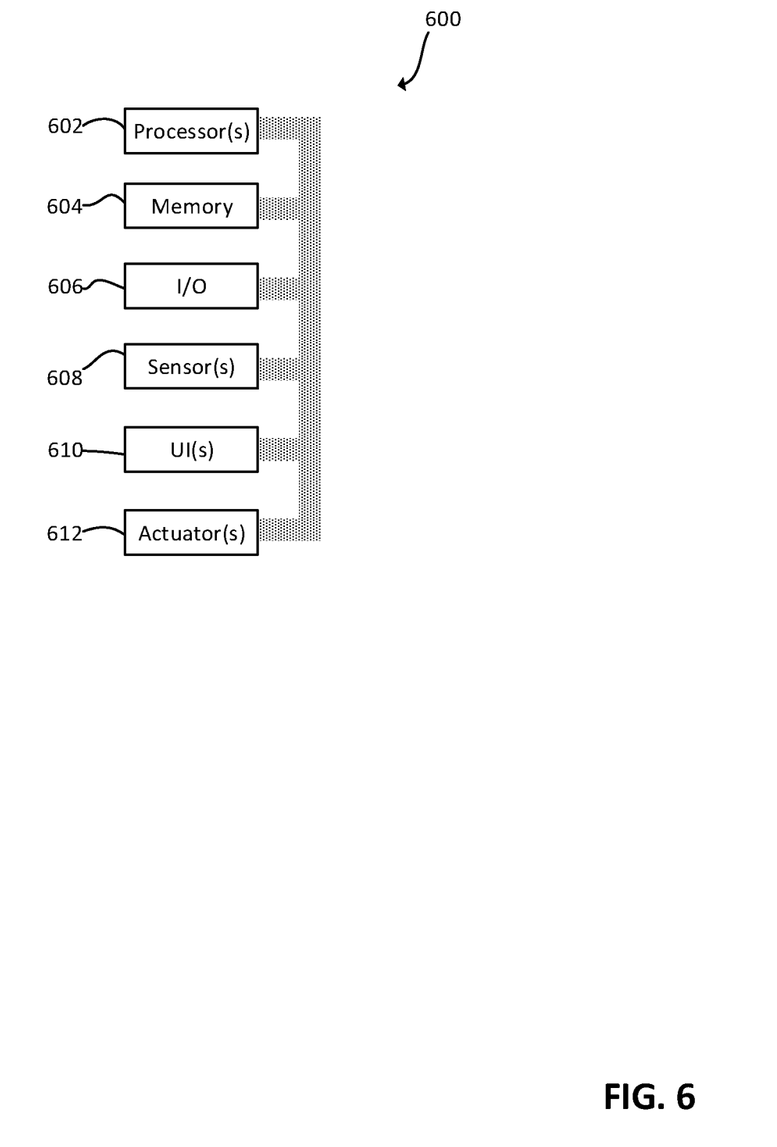
FIG. 6 is a block diagram of an exemplary processing system.

Referring to FIG. 6, a processing system 600 can include one or more processors 602, memory 604, one or more input/output devices 606, one or more sensors 608, one or more user interfaces 610, and one or more actuators 612. Processing system 600 can be representative of each computing system disclosed herein including host 110, intermediate processing system 112, TEE 114, client 120, and RAS 160.

Processors 602 can include one or more distinct processors, each having one or more cores. Each of the distinct processors can have the same or different structure. Processors 602 can include one or more central processing units (CPUs), one or more graphics processing units (GPUs), circuitry (e.g., application specific integrated circuits (ASICs)), digital signal processors (DSPs), and the like. Processors 602 can be mounted on a common substrate or to different substrates.

Processors 602 are configured to perform a certain function, method, or operation at least when one of the one or more of the distinct processors is capable of executing code (e.g., interpreting scripts), stored on memory 604 embodying the function, method, or operation. Processors 602, and thus processing system 600, can be configured to perform, automatically, any and all functions, methods, and operations disclosed herein.

For example, when the present disclosure states that processing system 600 performs/can perform task "X" (or that task "X" is performed), such a statement should be understood to disclose that processing system 600 can be configured to perform task "X". Processing system 600 are configured to perform a function, method, or operation at least when processors 602 are configured to do the same.

Memory 604 can include volatile memory, non-volatile memory, and any other medium capable of storing data. Each of the volatile memory, non-volatile memory, and any other type of memory can include multiple different memory devices, located at multiple distinct locations and each having a different structure. Memory 604 can include cloud storage.

Examples of memory 604 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code (e.g., scripts) saved in memory 604.

Input-output devices 606 can include any component for trafficking data such as ports, antennas (i.e., transceivers), printed conductive paths, and the like. Input-output devices 606 can enable wired communication via USB®, DisplayPort®, HDMI®, Ethernet, and the like. Input-output devices 606 can enable electronic, optical, magnetic, and holographic, communication with suitable memory 606. Input-output devices 606 can enable wireless communication via WiFi®, Bluetooth®, cellular (e.g., LTE®, CDMA®, GSM®, WiMax®, NFC®), GPS, and the like. Input-output devices 606 can include wired and/or wireless communication pathways.

Sensors 608 can capture physical measurements of environment and report the same to processors 602. User interface 610 can include displays, physical buttons, speakers, microphones, keyboards, and the like. Actuators 612 can enable processors 602 to control mechanical forces.

Processing system 600 can be distributed. Processing system 600 can have a modular design where certain features have a plurality of the aspects shown in FIG. 6. For example, I/O modules can include volatile memory and one or more processors.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method of instantiating a trained machine learning model with a host processing system comprising a trusted execution environment (TEE) and an untrusted processing system (UPS), the method comprising:
   preparing, with the host processing system, a compiler encoding an architecture of the trained machine learning model;
   receiving, from a client processing system, source data; and
   producing, with the compiler, software based on the received source data and model parameters stored on the host processing system, the software comprising an untrusted software component for performance on the UPS and a trusted software component for performance on the TEE, wherein the untrusted software component and the trusted software component are configured to, when performed in concert, instantiate the trained machine learning model,
   wherein the source data is securely routed from the client processing system to the TEE via the UPS in an encrypted form such that the source data is decipherable at the TEE and not decipherable at the UPS,
   wherein the machine learning model is configured to classify the source data to produce classification data, the machine learning model comprising a plurality of layers,
   wherein the method further comprises executing the untrusted software component with the UPS in concert with executing the trusted software component in the TEE such that the following operations are performed:
      instantiating the trained machine learning model such that a linear portion of one of the layers of the trained machine learning model is executed in the UPS, the linear portion being configured to execute a linear operation;
      providing, in the TEE, unblinded input data to an input layer of the trained machine learning model, the unblinded input data being provided based on the unencrypted source data;
      generating, in the TEE using the input layer operating on the unblinded input data, first unblinded output data;
      generating, in the TEE using the trained machine learning model, blinded intermediate data based on the unblinded input data or the first unblinded output data, the blinded intermediate data being decipherable by the TEE and being undecipherable by the UPS;
      providing the blinded intermediate data to the linear portion of one of the layers of the trained machine learning model that is executed in the UPS, and generating blinded intermediate output data by executing the linear operation on the blinded intermediate data;
      providing the blinded intermediate output data to the TEE, the blinded intermediate output data being decipherable by the TEE and being undecipherable by the UPS;
      converting, in the TEE, the blinded intermediate output data to unblinded intermediate output data;
      generating, in the TEE using a final layer of the machine learning model and based directly or indirectly on the unblinded intermediate output data, final unblinded output data, the final unblinded output data corresponding to the classification data; and
      securely routing the classification data from the TEE to the client processing system via the UPS such that the classification data is decipherable at the client processing system and not decipherable at the UPS, and
   wherein the unblinded input data, first unblinded output data, and final unblinded output data is not accessible by the UPS.

2. The method of claim 1, further comprising:
   provisioning, with the TEE, a secure enclave; and
   compiling the software within the secure enclave to conceal the trusted software component from the UPS.

3. The method of claim 1, further comprising:
   attesting, with the TEE and to the client processing system, integrity of the compiler based on receiving a request, from the client processing system, to process the source data with the trained machine learning model.

4. The method of claim 1,
   wherein executing the untrusted software component with the UPS in concert with executing the trusted software component in the TEE further comprises determining, with the TEE, the unblinded input data, the first unblinded output data, or unblinded data derived therefrom as an input to a layer of the trained machine learning model, wherein generating the blinded intermediate data comprises blinding, with the TEE, the input to produce a first blinded intermediate, wherein generating the blinded intermediate output data comprises applying, with the UPS, a weight to the first blinded intermediate to produce a second blinded intermediate as part of executing the linear operation of the layer of the trained machine learning model, wherein converting the blinded intermediate output data to unblinded intermediate output data comprises stripping, with the TEE, the blinding from the second blinded intermediate to produce an unblinded intermediate, wherein executing the untrusted software component with the UPS in concert with executing the trusted software component in the TEE further comprises applying, with the TEE, an activation function to the unblinded intermediate to produce an unblinded output of the layer, and wherein the final unblinded output data is generated based directly or indirectly on the unblinded output of the layer.

5. The method of claim 4, wherein the unblinded output of the layer is an activation of a node of the layer and the unblinded second intermediate quantifies a weighted local receptive field of the node.

6. The method of claim 4, wherein the layer is an earlier layer and the method further comprises:
determining, with the TEE, an unblinded input to a subsequent layer of the training machine learning model based on the unblinded output of the earlier layer;
blinding, with the TEE, the subsequent unblinded input to produce a subsequent blinded first intermediate;
applying, with the UPS, a subsequent weight to the subsequent first blinded intermediate to produce a blinded second intermediate;
stripping, with the TEE, the blinding from the subsequent second blinded intermediate to produce a subsequent unblinded intermediate; and
applying, with the TEE, an activation function to the subsequent unblinded intermediate to produce an unblinded output of the subsequent layer.

7. The method of claim 4, wherein the machine learning model comprises a deep neural network and the layer is an exit layer of the deep neural network.

8. The method of claim 1, wherein the UPS comprises a graphics processing unit (GPU).

9. A host processing system for instantiating a trained machine learning model, the host processing system comprising a trusted execution environment (TEE) and an untrusted processing system (UPS) and being configured to:
prepare a compiler encoding an architecture of the trained machine learning model;
receive, from a client processing system, source data; and
produce, with the compiler, software based on the received source data and model parameters stored on the host processing system, the software comprising an untrusted software component for performance on the UPS and a trusted software component for performance on the TEE, wherein the untrusted software component and the trusted software component are configured to, when performed in concert, instantiate the trained machine learning model,
wherein the source data is configured to be securely routed from the client processing system to the TEE via the UPS in an encrypted form such that the source data is decipherable at the TEE and not decipherable at the UPS,
wherein the machine learning model is configured to classify the source data to produce classification data, the machine learning model comprising a plurality of layers,
wherein the host processing system is further configured to execute the untrusted software component with the UPS in concert with the trusted software component in the TEE such that the following operations are performed:
instantiating the trained machine learning model such that a linear portion of one of the layers of the trained machine learning model is executed in the UPS, the linear portion being configured to execute a linear operation;
providing, in the TEE, unblinded input data to an input layer of the trained machine learning model, the unblinded input data being provided based on the unencrypted source data;
generating, in the TEE using the input layer operating on the unblinded input data, first unblinded output data;
generating, in the TEE using the trained machine learning model, blinded intermediate data based on the unblinded input data or the first unblinded output data, the blinded intermediate data being decipherable by the TEE and being undecipherable by the UPS;
providing the blinded intermediate data to the linear portion of one of the layers of the trained machine learning model that is executed in the UPS, and generating blinded intermediate output data by executing the linear operation on the blinded intermediate data;
providing the blinded intermediate output data to the TEE, the blinded intermediate output data being decipherable by the TEE and being undecipherable by the UPS;
converting, in the TEE, the blinded intermediate output data to unblinded intermediate output data;
generating, in the TEE using a final layer of the machine learning model and based directly or indirectly on the unblinded intermediate output data, final unblinded output data, the final unblinded output data corresponding to the classification data; and
securely routing the classification data from the TEE to the client processing system via the UPS such that the classification data is decipherable at the client processing system and not decipherable at the UPS, and
wherein the unblinded input data, first unblinded output data, and final unblinded output data is not accessible by the UPS.

10. The host processing system of claim 9 configured to:
provision, with the TEE, a secure enclave; and
compile the software within the secure enclave to conceal the trusted software component from the UPS.

11. The host processing system of claim 9 configured to:
attest, with the TEE and to the client processing system, integrity of the compiler based on receiving a request, from the client processing system, to process the source data with the trained machine learning model.

12. A non-transitory computer readable medium for instantiating a trained machine learning model with a host processing system comprising a trusted execution environment (TEE) and an untrusted processing system (UPS), the medium comprising program code for configuring the host processing system to:
prepare a compiler encoding an architecture of the trained machine learning model;
receive, from a client processing system, source data; and
produce, with the compiler, software based on the received source data and model parameters stored on the host processing system, the software comprising an untrusted software component for performance on the UPS and a trusted software component for performance on the TEE, wherein the untrusted software component and the trusted software component are configured to, when performed in concert, instantiate the trained machine learning model,
wherein the source data is configured to be securely routed from the client processing system to the TEE via the UPS in an encrypted form such that the source data is decipherable at the TEE and not decipherable at the UPS,
wherein the machine learning model is configured to classify the source data to produce classification data, the machine learning model comprising a plurality of layers,
wherein the program code further configures the host processing system to execute the untrusted software component with the UPS in concert with the trusted software component in the TEE such that the following operations are performed:
instantiating the trained machine learning model such that a linear portion of one of the layers of the trained machine learning model is executed in the UPS, the linear portion being configured to execute a linear operation;
providing, in the TEE, unblinded input data to an input layer of the trained machine learning model, the unblinded input data being provided based on the unencrypted source data;
generating, in the TEE using the input layer operating on the unblinded input data, first unblinded output data;
generating, in the TEE using the trained machine learning model, blinded intermediate data based on the unblinded input data or the first unblinded output data, the blinded intermediate data being decipherable by the TEE and being undecipherable by the UPS;
providing the blinded intermediate data to the linear portion of one of the layers of the trained machine learning model that is executed in the UPS, and generating blinded intermediate output data by executing the linear operation on the blinded intermediate data;
providing the blinded intermediate output data to the TEE, the blinded intermediate output data being decipherable by the TEE and being undecipherable by the UPS;
converting, in the TEE, the blinded intermediate output data to unblinded intermediate output data;
generating, in the TEE using a final layer of the machine learning model and based directly or indirectly on the unblinded intermediate output data, final unblinded output data, the final unblinded output data corresponding to the classification data; and
securely routing the classification data from the TEE to the client processing system via the UPS such that the classification data is decipherable at the client processing system and not decipherable at the UPS, and
wherein the unblinded input data, first unblinded output data, and final unblinded output data is not accessible by the UPS.

* * * * *